United States Patent [19]
Davies et al.

[11] 3,712,394
[45] Jan. 23, 1973

[54] LOAD COMPARISON SCALE

[75] Inventors: Jeffrey B. Davies, Amherst; Benjamin F. Kendig, Nashua, both of N.H.

[73] Assignee: Tridyne Corporation, South Merrimack, N.H.

[22] Filed: Aug. 15, 1969

[21] Appl. No.: 850,600

[52] U.S. Cl. .................................... 177/1, 177/200
[51] Int. Cl. ............................................. G01g 19/00
[58] Field of Search .......... 177/200, 1, 210, 211, 199

[56] References Cited

UNITED STATES PATENTS

| | | | |
|---|---|---|---|
| 3,552,511 | 1/1971 | Marcheso | 177/1 |
| 2,767,974 | 10/1956 | Ballard et al. | 177/200 UX |
| 2,767,975 | 10/1956 | Horst et al. | 177/200 |
| R24,969 | 4/1961 | Golding | 177/200 |
| 3,066,752 | 12/1962 | Spademan | 177/211 |
| 3,115,202 | 12/1963 | Langevin | 177/200 |
| 3,221,829 | 12/1965 | Kohler | 177/211 X |
| 3,240,281 | 3/1966 | Schaevitz | 177/210 |
| 3,437,160 | 4/1969 | Hill | 177/211 |
| 3,494,437 | 2/1970 | Fathauer | 177/200 |

*Primary Examiner*—George H. Miller, Jr.
*Attorney*—Wolf, Greenfield and Sacks

[57] ABSTRACT

A scale for quantitatively determining an unknown sample includes a pan for holding a known sample and another for an unknown sample. Scale deflection due to the known sample is translated into a representative electrical signal and coupled to a display device, as for example a digital voltmeter by a potentiometer. The potentiometer is adjusted so that the reading on the digital voltmeter corresponds quantatively with samples in the known sample pan. The known samples are then removed, and the unknown sample is placed on its corresponding pan. The deflection of that scale is likewise translated to an electrical signal representative of the deflection and coupled to the digital voltmeter through the aforementioned potentiometer. The reading on the digital voltmeter will then correspond to the quantity of the unknown sample.

14 Claims, 2 Drawing Figures

PATENTED JAN 23 1973 3,712,394

INVENTORS
JEFFREY B. DAVIES
BENJAMIN F. KENDIG
BY
Wolf, Greenfield, Hieken & Sacks
ATTORNEYS

LOAD COMPARISON SCALE

BACKGROUND OF THE INVENTION

The present invention relates in general to counting devices and more particularly concerns a novel automatic counting scale of high electrical performance and inexpensive to fabricate in large or small quantities with uniformly high quality.

In recent years, counting systems have been evolved offering digital count readout and printout. These often are complex devices utilizing two or more scales in conjunction with calculating equipment. A low capacity scale is used to weight a known quantity of sample pieces, weight output being converted to electrical signals and transmitted to a desk type calculator. The unknown quantity of parts is placed on a high capacity portion of the scale, this weight data also being converted and transmitted to the calculator. The calculator then must divide the unknown quantity in weight by the sample weight, thereby determining the number of pieces in the previously unknown quantity. Although this method is fairly accurate, it does present a large and complex system and is expensive.

Also, method such as hand counting and calculating by ratio methods have been used. But, likewise, these methods are time consuming and expensive, often resulting in gross errors when used by inexperienced or inattentive operators.

Accordingly, it is an important object of this invention to provide an automatic counting scale which is extremely simple both in operation and in design.

It is another object of the invention to provide an automatic counting scale in accordance with the preceding object which provides a visual display of both the known and unknown counts.

It is another object of the invention to provide an automatic counting scale in accordance with the preceding object which may still function effectively as a weighting scale for other purposes.

It is another object of this invention to provide an automatic counting scale which will automatically and accurately count parts of substantially uniform weight and offer a digital display of the number of parts in an unknown quantity.

It is another object of the invention to provide an automatic counting scale whose output signal is susceptible to use by and transmission to data collection equipment such as a printer, card, tape punch or to a computer.

It is another object of the invention to provide an automatic counting scale which will provide a quick, accurate count of an unknown quantity of parts of uniform or semi-uniform weight, thereby eliminating laborious hand counting of these parts.

It is another object of this invention to provide an automatic counting scale in accordance with the preceding objects in which the errors resulting from such laborious hand counting are eliminated.

SUMMARY OF THE INVENTION

According to the invention, a deflection weighing scale includes two or more pans, one for holding a quantitatively indentified sample and the other for holding an unidentified sample of objects of substantially uniform weight. The scale is adapted for deflection proportional to the weight on the respective pans. On application of the known sample to its corresponding pan, the scale deflects in proportion to the weight on the pan. A displacement transducer couples to the scale and provides an output signal in proportion to the sensed displacement. A switch intercouples the transducer with an amplifier circuit. The amplifier circuit and an amplitude varying device, as for example a potentiometer, intercouple the transducer with a display device, as for example a digital voltmeter. The potentiometer allows the visual display of the digital voltmeter to be adjusted so that it corresponds to the quantity of samples placed in the known sample pan.

After the known sample is removed from its pan, the unknown sample is placed upon its corresponding pan. Another displacement transducer coupled to the unknown sample pan translates the scale deflection into an electrical signal representative thereof. The switch is then switched to receive the electrical signal, and the signal is transmitted through the above amplifier circuit and potentiometer to the digital voltmeter. The digital voltmeter will now indicate the quantity of the unknown sample. A single pole double throw switch may selectively intercouple the transducers with the amplifier. Moreover, the single pole double throw switch may be ganged with a corresponding switch on the digital voltmeter to compensate for different deflection ratios of the known and unknown scale pans, thereby providing an accurate digital readout. Also, the digital voltmeter may provide an output signal suitable for data collection or computer devices.

Numerous other features, objects and advantages of the invention will become apparent from the following specification when read in conjunction with the accompanying drawings in which:

DETAILED DESCRIPTION OF PREFERRED EMBODIMENTS

Corresponding reference symbols will be used through-out the drawings to indicate corresponding elements where applicable.

Figure 1:
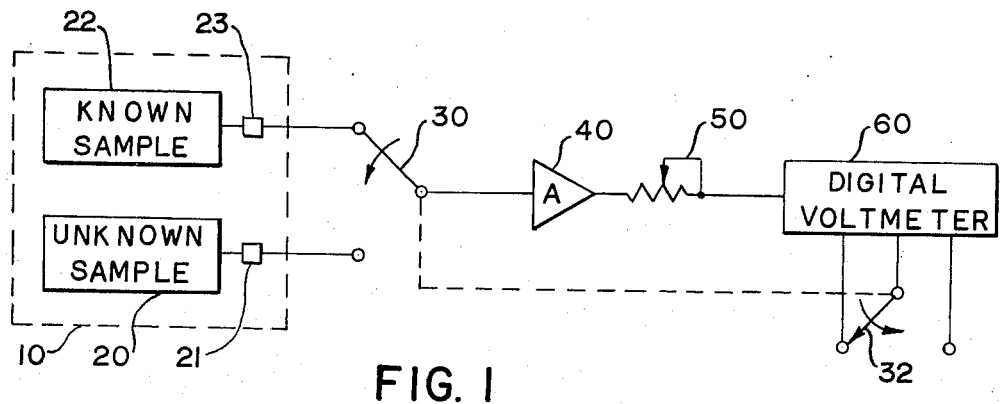
FIG. 1 is a block diagram of the preferred embodiment of the invention.
Figure 2:
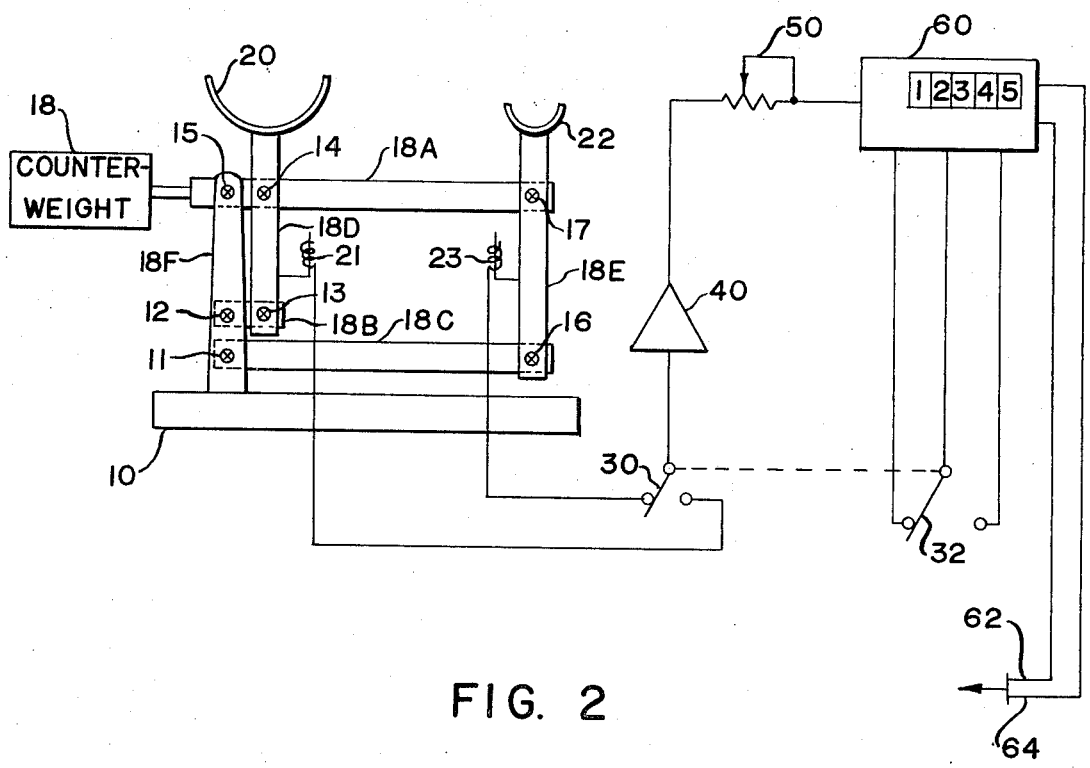
FIG. 2 is a schematic circuit diagram of a preferred embodiment of the invention further showing the elements of the scale.

With reference now to the drawings and more particularly to FIG. 2 thereof, there is shown a block diagram of the invention in which a deflection scale 10 is fitted with pans 20 and 22 for holding unknown and known samples, respectively. The objects to be counted are required to be of substantially uniform weight. First, a known quantity of samples is placed upon scale pan 22 deflecting g the scale proportionally to the weight. Displacement transducer 23 translates the deflection into an electrical signal representative thereof. Switch 30 is positioned to couple that signal to amplifier 40 wherein that electrical signal is amplified. An amplitude varying device 50, as for example a potentiometer, couples that amplified electrical signal to a display device, as for example a digital voltmeter 60. Potentiometer 50 may be adjusted so that the display on the digital voltmeter 60 corresponds to the quantity of samples in the known sample pan, thus calibrating the system. The known quantity of objects is then removed from the sample pan 22 and an unknown quantity of objects is placed upon unknown pan 20. Again, pan 20 causes the scale to deflect in proportion with the weight upon pan 20. Displacement transducer 21 converts the deflection into an electrical signal representative thereof. Switch 30 may be switched to accept the electrical signal and may be coupled with a range switch on the digital voltmeter to allow for different deflection ratios of the known and unknown sample pans. The electrical signal then passes through the precalibrated combination of amplifier 40 and potentiometer 50 to digital voltmeter 60 where the display indicates the quantity of samples in the unknown pan.

With reference now to FIG. 2, scale 10 is provided with levers 18A, 18B, 18C, 18D and 18E interengaged with one another and supported by beam 18F. Counterweight 18 balances one end of lever 18A supported by beam 18F at pivot 15. Lever 18C is supported parallel to lever 18A by lever 18E and beam 18F. Lever 18A is pivotally supported by pivots 15 and 17; lever 18C by pivots 11 and 16; lever 18E is pivotally supported by pivots 16 and 17. Levers 18B and 18D are pivotally interengaged by pivot 13, and lever 18B is pivoted to beam 18F by pivot 12. Known sample pan 22 and sample pan 20 are supported on beam 18E and 18D. Sample pan 20 is coupled to scale 10 through pivots 13 and 14 and arms 18A and 18B. Sample pan 22 is coupled to scale 10 through pivots 16 and 17 and arms 18A and 18C. Displacement transducer 21 is positioned to sense the deflection of unknown sample pan 20, and displacement transducer 23 is positioned to sense the deflection of known pan 22. The respective electrical signals resulting from the deflections are coupled selectively by switch 30 to amplifier 40 and potentiometer 50. The system is calibrated (in the same manner as above) by adjusting potentiometer 50 so that the display on digital voltmeter 60 corresponds to the quantity of samples in known sample pan 22. The resulting electrical signal from the deflection of unknown pan 20 will be displayed by visual voltmeter 60 indicating the quantity of samples in unknown pan 20. Digital voltmeter 60 may provide output leads 62 and 64 for connection with data collection equipment or computer equipment.

The known and unknown sample pans may offer different mechanical ratios to the scale. For example, the known sample pan of FIG. 2 may deflect the scale 5 inches if a 5 pound weight is placed thereon, while the unknown sample pan may deflect the scale only 0.50 inches for 50 pounds of weight. If the respective displacement transducers for the pans were matched, the resulting electrical signals would be of a 100 to 1 ratio for equal weights on each pan. Thus, in order to compensate for the different mechanical ratios, a range switch on the digital voltmeter may be operated, and preferably, ganged with the switch selecting the displacement transducers. Also, the selector switch for the transducers may be fitted with stepping elements, as for example resistors, so that the input electrical signal to the amplifier corresponds directly to the weight upon the scale pans.

The invention is illustrated with a switch intercoupling the displacement transducers with the amplifier. The switch may be of the single pole double throw type, a diode switch or any other convenient type. Also, the switch may take the form of a digital "OR" circuit, to allow for exclusive selection of displacement transducer signals.

The displacement transducers may be linear differential transformers or any type of transducers to allow convenient use of the invention. The transducers may take the form of transformers having electrical output signals proportional to the mechanical ratios of the pans, thus yielding electrical signals of amplitude proportional to the weight on the scale. Linear differential transformers, often called linear variable differential transformers, may be excited from the same source and yield an output voltage linearly proportional to the displacement of a core inserted through the windings. However, the linear relationship prevails only when the core is moderately near the center of the winding assembly.

An important feature of the invention is the adjustment of the amplitude in the electrical signal thereby conforming the output of the visual display with the number of pieces in the sample weighing. Another important feature of the invention is the adaptability of the device of the digital voltmeter displays. Also, the digital display may be suitable for actuating printer, card or tape punch equipment, or a computing device.

Another feature of the invention is the adaptability of the device to be used with weighing or force measuring devices. The invention may be applied to existing scales and devices thereby fully automating them for quantitative measurements. For example, an adapter kit consisting of linear differential transformers, an electrical signal source, range switch, amplifiers, potentiometer and digital voltmeter may be applied to virtually any existing deflection scale. The linear differential transformers may yield output signals proportional to the mechanical ratios of the respective pans, thus deriving output signals which correspond directly to the weight placed upon the scale, and hence, the quantity of samples.

Another important feature of the invention is the adaptability of the device for use in counting parts during production, for shipping purposes, for inventory, or for automatic perpetual inventory control, and for other uses.

An important feature of the invention is the adaptability of the device for use with different capacity weighing devices. Also, the invention may be used with different mechanical ratio weighing pans. The switch for the displacement transducers may be coupled to digital voltmeter range switch so that the pan ratios may be conformed.

The invention is illustrated with a potentiometer as the amplitude adjustment for the electrical signal. The amplitude adjusting device may be any device sufficient to conform the reading of the visual display to the quantity in the known sample pan.

The amplifier may be any type of amplifier which may supply sufficient voltage for the digital voltmeter. The amplifier must, however, be substantially linear over the range of voltages generated by the transducers.

Other modifications and uses of and departures from the specific embodiments as described herein may be practiced by those skilled in the art without departing from the inventive concepts. Consequently, the invention is to be construed as embracing each and every novel feature and novel combination of features present in and possessed by the apparatus and techniques herein disclosed and limited solely by the spirit and scope of the appended claims.

What is claimed is:

1. A measuring device for quantitatively identifying an unknown sample comprising, scale means for quantitatively identifying a sample input having a known quantity, means for applying said quantitatively known sample as an input to said scale means, transducer means responsive to application of said known sample for converting an output of said scale means to a representative electrical signal, means for adjusting the output of said transducer means to quantitatively correlate with said quantitatively known sample, and means for applying the unknown sample to said scale means, said means for applying said unknown and known samples including intercoupled leverage means adapted for deflection on application of said samples, and holding means for carrying said samples.

2. A measuring device as set forth in claim 1 wherein said means for adjusting includes circuit means for intercoupling said scale means with a display means, said circuit means responsive to said electrical signal and including variable means for controlling at least in part the amplitude of said electrical signal.

3. A measuring device as set forth in claim 2 wherein said display means includes digital display means responsive to said controlled electrical signal for indicating said quantitative indicia.

4. A measuring device as set forth in claim 3 wherein said circuit means includes switchable means and amplifier means, said switchable means adapted for selectively applying said electrical signal to said amplifier means.

5. A measuring device as set forth in claim 4 wherein said variable means includes potentiometer means and said digital display means includes digital voltmeter means.

6. A measuring device as set forth in claim 5 wherein said digital voltmeter means includes means for providing an output signal for actuating data collection means, such as a printer or computer.

7. A measuring device as set forth in claim 5 wherein said means for translating includes linear variable transformer means for translating deflection into an electrical signal representative thereof.

8. A measuring device as set forth in claim 7 wherein said switchable means responsively couples to a switch means on said digital voltmeter for providing a digital display of the quantity of said unknown sample.

9. A measuring device for quantitatively identifying an unknown sample of uniform objects, comprising, means for indicating a unit standard from a sample input of a known quantity of said objects including display means, and weighing means for deflecting said display means in response to said sample input, means for adjusting said display means to a read-out corresponding quantitatively to the number of objects of said known quantity, transducing means coupled from said weighing means to said display means for converting the weight of said sample input into a representative electrical signal, said means for adjusting including circuit means intercoupling said transducing means and said display means, responsive to said electrical signal, and including means for varying at least in part the amplitude of said electrical signal, and means for deflecting said display means in response to an unknown sample of said uniform objects including means for maintaining said unknown sample deflecting means in linear proportion to said known sample deflecting means over a range of deflections, said weighing means for deflecting said display means in response to said sample input and said means for deflecting said display means in response to an unknown sample comprising intercoupled leverage means.

10. A measuring device as set forth in claim 9 wherein said means for varying includes a potentiometer circuit.

11. A method of determining the quantity of one magnitude of an unknown sample of objects of substantially uniform weight, which method comprises, placing a known sample of said objects in a quantity of a magnitude different from said unknown sample on a deflection scale capable of measuring a sample of said different magnitude, deriving an electrical signal representative of the deflection of said scale, displaying said electrical signal on a digital voltmeter, adjusting the display to provide a unit standard corresponding with the known quantity of said objects, removing said known quantity from said deflection scale, placing an unknown quantity of said objects on deflection scale capable of measuring objects of said first magnitude, maintaining said deflection scales in linear relation over a range of deflections and thereafter, reading said unknown quantity on said digital voltmeter.

12. A method of determining the quantity of an unknown sample of objects of substantially uniform weight as set forth in claim 11, wherein said adjusting includes varying the amplitude of said electrical signal thereby calibrating the display.

13. A method of determining the quantity of an unknown sample of objects of substantially uniform weight as set forth in claim 12 and further comprising, extracting an output signal from said digital voltmeter representative of the display thereon and adapting said output signal for use with data collection or printout devices.

14. A method of determining the quantity of an unknown sample of objects of substantially uniform weight as set forth in claim 13, wherein said deriving includes translating a substantially vertical movement into an electrical signal representative thereof by a linear variable differential transformer.

* * * * *